June 11, 1963  R. BINDER  3,093,228
AUTOMOTIVE PLATE SPRING FRICTION CLUTCH
Filed May 20, 1960

INVENTOR:
RICHARD BINDER
By
Richardson, David and Nordon
Atty's.

3,093,228
AUTOMOTIVE PLATE SPRING FRICTION CLUTCH
Richard Binder, Schweinfurt (Main), Germany, assignor to Fichtel & Sachs A.G., Schweinfurt (Main), Germany, a corporation of Germany
Filed May 20, 1960, Ser. No. 30,487
Claims priority, application Germany May 26, 1959
2 Claims. (Cl. 192—89)

The present invention relates to friction clutches and more particularly to clutches of this type which are provided with a plate-like spring for disengaging the clutch the same plate spring also serving to hold the clutch engaged.

Mast conventional plate spring clutches include a ball bearing control member which directly engages the plate spring. However, where the clutch is to be controlled by a self-lubricating carbon ring or by a separately mounted ball bearing, it is necessary to provide a control ring which is connected to the plate spring for rotation therewith. The control ring is provided with a flat annular surface for engagement by the carbon ring or separate ball bearing, the control ring being suitably centered and mounted on the plate spring.

A principal object of the present invention is to provide a simplified control ring construction which is economical to produce.

Another feature of the invention is the arrangement of the control ring in such a manner that the axial displacement of the helical compression spring which presses the control ring against the plate spring is minimized during the course of engagement and disengagement of the clutch. This feature reduces fatigue of the compression spring and also permits the use of a relatively short and stiff compression spring.

The invention will be better understood from the following specification taken together with the accompanying drawing forming a part hereof.

Referring to the drawing.

Figure 1:
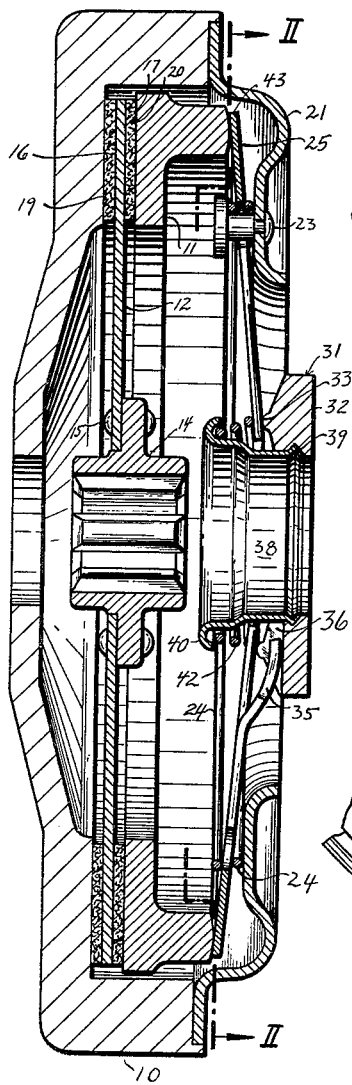
FIGURE 1 is a view in axial section of a clutch embodying the invention.
Figure 2:
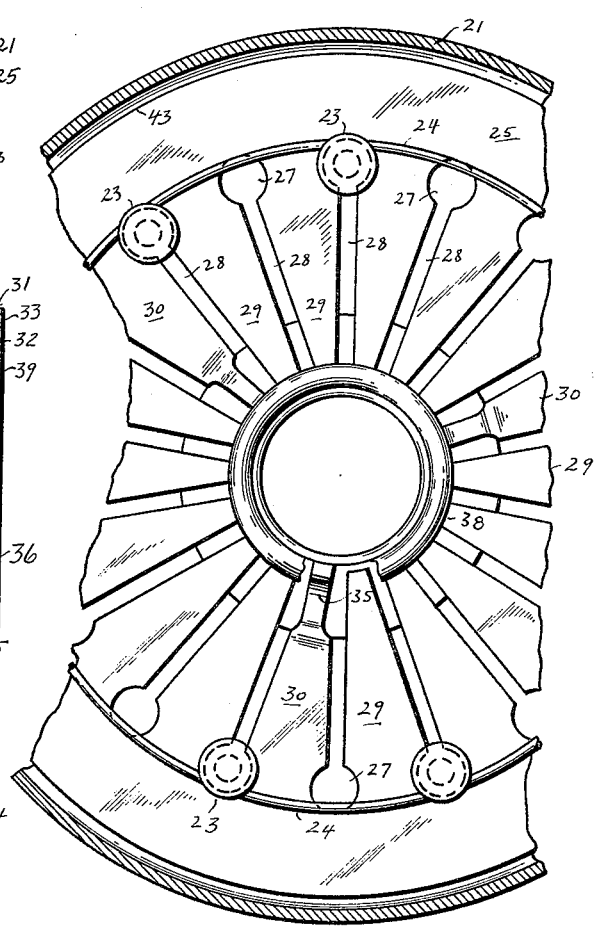
FIGURE 2 is a fragmentary sectional view taken along the line II—II of FIG. 1.

The clutch compises a driving member 10 which may advantageously be the flywheel of an internal combustion engine (not shown). A pressure ring 11 is carried by the driving member 10 and is suitably connected thereto by any desired means (not shown) for rotation with the driving member 10 and for axial displacement with respect thereto. A driven disc member 12 is provided with a hub 14 secured thereto by rivets 15. The hub 14 is adapted to be connected to a driven shaft which extends to the transmission of a motor vehicle (not shown) or other load. The driven member 12 is provided with annular friction facings 16 and 17. The friction facing 16 is engageable with a cooperating friction surface 19 formed on the driving member 10. The friction facing 17 is engageable with a cooperating friction surface 20 formed on the pressure ring 11. When leftward (as viewed in FIG. 1) pressure is applied to the pressure ring 11, the clutch is engaged. When this pressure is removed, the clutch is disengaged.

A circular housing 21, open at its center, is fixed to the driving member 10. A circularly arranged series of supporting studs 23 is riveted to the housing 21. Two circular fulcrum hoops 24, each formed of wire of circular cross-section, encircle and pass around the series of supporting studs 23, being supported thereby. A radially slotted plate spring 25 is supported between the wire fulcrum hoops 24. The plate spring 25 has a series of circular apertures 27 formed therein through which the shanks of the supporting studs 23 pass.

A regularly arranged series of radially inwardly extending slots 28 is formed in the plate spring 25, each slot extending radially inwardly from one of the apertures 27. These slots define a series of tongues 29 and three specially shaped centering tongues 30. The fulcrum hoops 24 engage the plate spring 25 substantially at the roots of the tongues 29, 30. A control ring designated generally as 31 is provided with a flat annular surface 32 adapted for engagement by a self-lubricating carbon ring or a separate ball bearing member (not shown) for controlling the clutch. The control ring 31 is supported and centered by the free ends of the tongues 29, 30. A circular fulcrum ridge 33 is formed on the side of the control ring 31 opposite the flat surface 32. The inner ends of the tongues 29 bear against the fulcrum ridge 33.

The inner ends 35 of the centering tongues 30 are formed with straight parallel sides and engage in radial slots 36 formed in the control ring 31. The slots 36 interrupt the circular fulcrum ridge 33 so that it consists of a series of arcuate ridges concentric with the rotational axis of the clutch and facing the driving member 10. The inner ends 35 of the tongues 30 are curved with a radius of curvature which bears a ratio of about 5:1 with respect to the radius of curvature of the fulcrum ridge 33. For ordinary automotive use, the radius of curvature of the fulcrum ridge 33 is desirably about 2–3 millimeters. The tongues 29, 30 are so arranged that the inner ends of all of the tongues simultaneously engage the control ring 31, bearing either against the fulcrum ridge 33 or bearing against the bottoms of the slots 36, respectively.

A spring retaining cup 38 has one end fixedly secured to the control ring 31 by being rolled into an annular groove 39 formed in the control ring 31 near the flat surface 32. The other end of the cup 38 is turned back to form a lip 40 which supports one end of a helical compression spring 42. The other end of the compression spring 42 bears against the inner ends of the tongues 29 at the portions thereof where these inner ends engage the fulcrum ridge 33. In this manner, the spring 42 is compressed or expanded only slightly by axial movement of the control ring 31 during the course of engagement and disengagement of the clutch. Accordingly, the compression spring may be made relatively short and stiff so that fatigue of the spring is minimized.

Near its outer edge 43, the plate spring 25 bears against the pressure ring 11, normally applying leftwardly directed (FIG. 1) pressure to the pressure ring 11 so that the clutch is held engaged. Upon leftward displacement of the control ring 31, the inner ends of the tongues 29 and 30 are moved leftwardly and the plate spring is bent, the bending including a pivotal movement at those places where the plate spring 25 engages the portions of the fulcrum hoops 24 which are supported by the heads of the supporting studs 23. This bending of the plate spring 25 causes displacement of its edge portion toward the right (FIG. 1) so that the pressure normally applied to the pressure ring 11 is removed and the clutch is disengaged.

While I have shown and described what I believe to be the best embodiment of my invention, it will be apparent to those skilled in the art that various changes and modifications may be made therein without departing from the spirit and scope of the invention as defined in the appended claims.

What is claimed is:

1. A clutch of the class described, comprising: a revoluble driving member, a revoluble driven member coaxial with said driving member, a pressure ring connected for rotation coaxially with said driving member, said pressure ring being axally displaceable with respect to said driving member, said driven member having a peripheral portion interposed between said driving member and said pressure ring, means defining friction surfaces for coupling said driven member both to said driving member and to said pressure ring upon the application of axially directed pressure to said pressure ring urging said pressure ring toward said driving member, a circular radially slotted plate spring member coaxial with said driving member and having tongue portions which extend inwardly from the peripheral portion thereof, said peripheral portion engaging said pressure ring, fulcrum means carried by said driving member and engaging said plate spring member substantially at the roots of said tongue portions, an axially displaceable circular control member coaxial with said driving member, said control member being centered and supported by the free ends of certain regularly arranged ones of said tongue portions, said control member having a circular fulcrum ridge formed on the side thereof facing said driving member, the free end portions of the others of said tongue portions engaging said fulcrum ridge, said control member having radially extending slots formed therein wherein the free end portions of said ones of said tongue portions are received, said peripheral portion of said plate spring member normally applying pressure yieldingly urging said pressure ring toward said driving member for holding said clutch engaged, movement of said control member toward said driving member causing bending of said plate spring member pivotally with respect to said fulcrum means to withdraw said pressure normally applied to said pressure ring, a cylindrical cup carried by said control member centrally thereof, one end of said cup being turned back to form a lip, the other end being secured to said control member, and a helical compression spring surrounding said cup, one end of said compression spring bearing against said lip, the other end of said compression spring bearing against said others of said tongue portions where said fulcrum ridge is engaged thereby, whereby deformation of said compression spring during engagement and disengagement of said clutch is minimized.

2. A clutch according to claim 1, wherein said control member has a circular groove formed therein, said other end of said cup engaging in said groove for securing said cup to said control member.

References Cited in the file of this patent

UNITED STATES PATENTS

| | | |
|---|---|---|
| 1,936,031 | Ruesenberg | Nov. 21, 1933 |
| 2,064,450 | Space | Dec. 15, 1936 |
| 2,117,482 | Klix | May 17, 1938 |
| 2,399,886 | Odevseff | May 7, 1946 |
| 2,630,897 | Porter | Mar. 10, 1953 |
| 2,682,943 | Root | July 6, 1954 |
| 2,725,964 | Maurer | Dec. 6, 1955 |
| 2,770,341 | Wobrock | Nov. 13, 1956 |
| 2,835,366 | Haussermann | May 20, 1958 |
| 2,885,047 | Kehrl | May 5, 1959 |